United States Patent
Kellner et al.

(10) Patent No.: US 11,532,849 B2
(45) Date of Patent: Dec. 20, 2022

(54) BATTERY MODULE FOR A MOTOR VEHICLE AND METHOD FOR THE PRODUCTION THEREOF

(71) Applicant: Dr. Ing. h.c. F. Porsche Aktiengesellschaft, Stuttgart (DE)

(72) Inventors: Philipp Kellner, Renningen (DE); Ralf Keller, Pforzheim (DE); Tassilo Gilbert, Pforzheim (DE); Sascha Mostofi, Zeltingen (DE); Jens Bohlien, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 27 days.

(21) Appl. No.: 16/846,668

(22) Filed: Apr. 13, 2020

(65) Prior Publication Data
US 2020/0328386 A1   Oct. 15, 2020

(30) Foreign Application Priority Data

Apr. 12, 2019   (DE) ...................... 10 2019 109 715.0

(51) Int. Cl.
*H01M 50/224* (2021.01)
*H01M 10/04* (2006.01)
(Continued)

(52) U.S. Cl.
CPC ..... *H01M 50/224* (2021.01); *H01M 10/0481* (2013.01); *H01M 50/211* (2021.01);
(Continued)

(58) Field of Classification Search
None
See application file for complete search history.

(56) References Cited

U.S. PATENT DOCUMENTS

| 4,554,226 A | 11/1985 | Simonton |
| 9,941,542 B1 | 4/2018 | Melack et al. |
| (Continued) | | |

FOREIGN PATENT DOCUMENTS

| AT | 519 967 | 12/2018 | |
| AT | 519 968 | 12/2018 | |
| WO | WO-2018223166 A1 * | 12/2018 | ............ H01M 50/20 |

OTHER PUBLICATIONS

German Examination Report dated Nov. 15, 2019.

*Primary Examiner* — Gregg Cantelmo
(74) *Attorney, Agent, or Firm* — Gerald E. Hespos; Michael J. Porco; Matthew T. Hespos

(57) ABSTRACT

A battery module for a motor vehicle has a battery module housing (30) with an insertion opening (32) and at least one battery cell package (40) is arranged in the battery module housing (30). The battery cell package (40) has at least two battery cells (42) arranged parallel to one another and at least one compression pad (44) arranged parallel to the battery cells (42). The battery cells (42) and the at least one compression pad (44) are stacked one on top of the other in any desired order in a thickness direction (D). The battery cell package (40) is inserted in an insertion direction (E) through the insertion opening (32) into the battery module housing (30). The battery cell package (40) also has two insertion auxiliary layers (46) that respectively form outer sides (41) of the battery cell package (40) that are opposite in the thickness direction (D).

19 Claims, 2 Drawing Sheets

(51) Int. Cl.
*H01M 50/211* (2021.01)
*H01M 50/249* (2021.01)
*H01M 50/293* (2021.01)

(52) U.S. Cl.
CPC ....... *H01M 50/249* (2021.01); *H01M 50/293* (2021.01); *H01M 2220/20* (2013.01)

(56) References Cited

U.S. PATENT DOCUMENTS

| | | | |
|---|---|---|---|
| 2011/0135985 A1* | 6/2011 | Kim | H01M 10/647 429/120 |
| 2013/0157099 A1* | 6/2013 | Anderson | H01M 10/6557 429/120 |
| 2014/0038029 A1* | 2/2014 | Thurmeier | H01M 10/0481 429/156 |
| 2014/0360344 A1* | 12/2014 | Pilpel | B32B 5/18 89/36.02 |
| 2015/0214570 A1* | 7/2015 | Deponte | H01M 10/0481 429/99 |
| 2016/0197385 A1* | 7/2016 | Matsumoto | H01M 10/617 429/120 |
| 2016/0308180 A1* | 10/2016 | Koh | B60L 50/64 |
| 2016/0329538 A1* | 11/2016 | Hughes | H01M 10/052 |
| 2017/0244081 A1* | 8/2017 | Tononishi | H01G 11/18 |
| 2018/0048036 A1* | 2/2018 | Melack | H01M 50/20 |
| 2018/0083306 A1* | 3/2018 | Melack | H01M 6/42 |
| 2019/0198830 A1* | 6/2019 | Kawakami | H01M 50/502 |

* cited by examiner

BATTERY MODULE FOR A MOTOR VEHICLE AND METHOD FOR THE PRODUCTION THEREOF

CROSS REFERENCE TO RELATED APPLICATION

This application claims priority under 35 USC 119 to German Patent Appl. No. 10 2019 109 715.0 filed on Apr. 12, 2019, the entire disclosure of which is incorporated herein by reference.

BACKGROUND

Field of the Invention

The invention relates to a battery module for a motor vehicle and to a method for the production thereof.

Related Art

A battery module for a motor vehicle generally has one of three different cell types, names: cells with a solid cylindrical housing, so-called round cells; cells with a cuboidal solid housing, so-called prismatic cells; and flat cells without a solid housing, so-called pouch cells.

Pouch cells potentially have the highest volumetric and gravimetric energy density, since they do not have a dedicated housing.

The prior art typically combines multiple battery cells to form a battery module. The battery module connects cells to form a that can be handled electrically and mechanically. Pouch cells are flexible and therefore must be protected by a solid housing. Additionally, pouch cells must be subjected to a pressure from the outside to have a long service life. In this respect, U.S. Pat. No. 4,554,226 teaches the use of compression pads of elastic foam with a high gas fraction to tension pouch cells in the thickness direction. This design is intended to achieve high compressibility together with a small residual block size when completely compressed.

The motor vehicle may be an electrically driven or partially electrically driven motor vehicle, and the battery may correspondingly be a traction battery.

It is an object of the invention to provide a battery module with reduced weight, structural space requirement and production costs.

SUMMARY

The invention relates to a battery module for a motor vehicle. The battery module comprises a battery module housing with an insertion opening and at least one battery cell package is arranged in the battery module housing. The battery cell package has at least two battery cells arranged parallel to one another and at least one compression pad is arranged parallel to the battery cells. The at least two battery cells and the at least one compression pad are stacked one on top of the other in any desired order in a thickness direction. The battery cell package is inserted in an insertion direction through the insertion opening into the battery module housing. The battery cell package also has two insertion auxiliary layers that respectively form outer sides of the battery cell package and that are situated oppositely in the thickness direction.

Weight, costs and structural space can be reduced by the invention. High process reliability and low reject rates also can be achieved by this embodiment. The components that have to be removed from the battery housing after assembly of the battery can also be avoided.

The battery cell of the battery module may be a pouch cell.

The battery module housing may be formed from a unipartite profile, in particular from an aluminum extruded profile.

The battery cell package of one embodiment has two compression pads arranged parallel to the battery cells, and each compression pad may be arranged between an outer battery cell and one of the insertion auxiliary layers.

Each insertion auxiliary layers may be formed from a metal sheet or from fiber-reinforced plastic. The fiber-reinforced plastic may comprise fibers extending parallel to the insertion direction.

The battery module also may comprise a friction-reducing coating arranged either on the outside of the insertion auxiliary layers or on the inside of inner walls of the battery module housing that are opposite the insertion auxiliary layers. The friction-reducing coating may be a polytetrafluoroethylene coating, such as a Teflon coating.

The at least two battery cells, the at least one compression pad and the insertion auxiliary layers of one embodiment are bonded adhesively to one another.

The invention also relates to a method for producing a battery module according to the invention. The method comprises:

providing a battery module housing that has an insertion opening;

providing a battery cell package that has at least two battery cells arranged parallel to one another and at least one compression pad arranged parallel to the battery cells, with the battery cells and the at least one compression pad being stacked one on top of the other in any desired order in a thickness direction and the battery cell package also having two insertion auxiliary layers disposed respectively to form outer sides of the battery cell package that are opposite in the thickness direction;

compressing the battery cell package in the thickness direction; and inserting the compressed battery cell package in an insertion direction through the insertion opening into the battery module housing.

The insertion direction and the thickness direction may be approximately orthogonal to one another.

The battery cell package may be compressed by cylindrical rollers, such as rubberized cylindrical rollers.

Details and further advantages of the battery module according to the invention and of the method according to the invention are explained on the basis of the exemplary embodiment described below.

DETAILED DESCRIPTION

Figure 1:
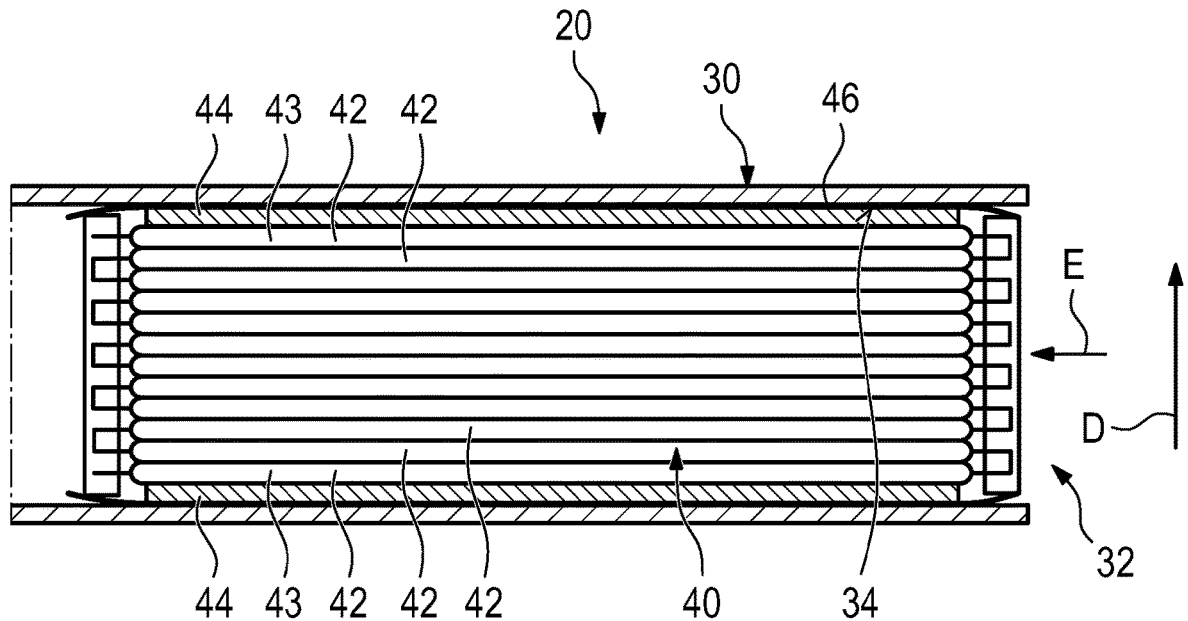
FIG. 1 is a schematic sectional view of a battery module according to one exemplary embodiment.
Figure 2:
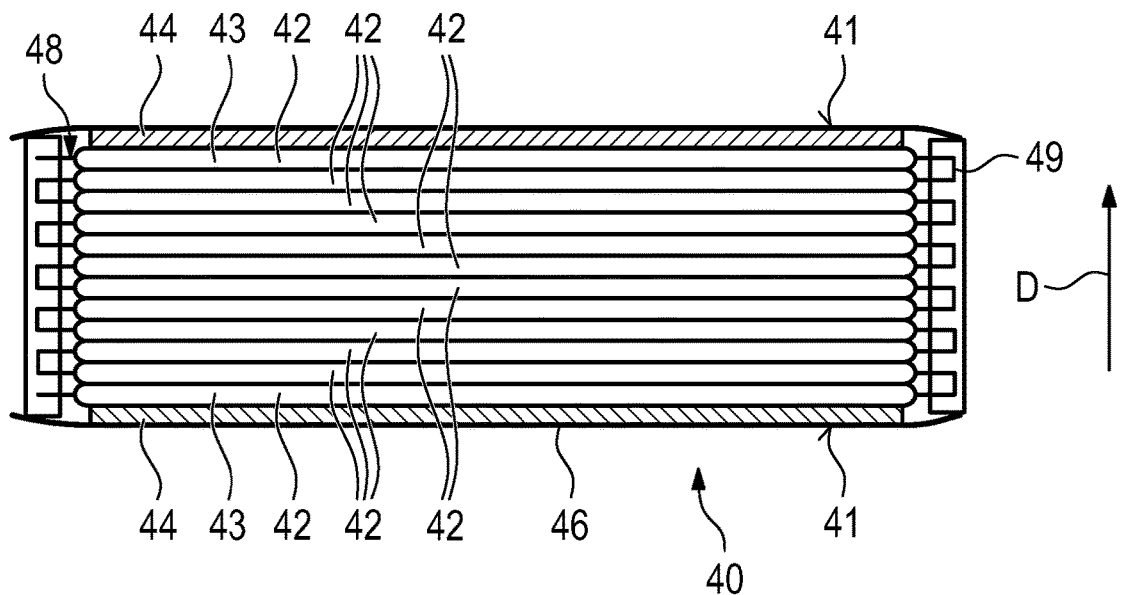
FIG. 2 is a schematic sectional view of a battery cell package of the battery module according to the exemplary embodiment.

The application relates to a battery module 20 for a motor vehicle, comprising a battery module housing 30 with an insertion opening 32 and at least one battery cell package 40 arranged in the battery module housing 30. The battery cell package 40 has at least two battery cells 42 arranged parallel to one another and at least one compression pad 44 arranged parallel to the battery cells 42. The at least two battery cells 42 and the at least one compression pad 44 are stacked one on top of the other in any desired order in a thickness direction D. The battery cell package 40 is inserted in an insertion direction E through the insertion opening 32 into the battery module housing 30. The battery cell package 40 also has two insertion auxiliary layers 46 that respectively form outer sides 41 of the battery cell package 40 that are situated oppositely in the thickness direction D.

Weight, costs and the structural space requirement of the battery of the motor vehicle can be reduced by the battery module 20.

The battery cells 42 may be pouch cells.

The insertion auxiliary layers 46 may be thin and flexible. In particular, the insertion auxiliary layers 46 may be thinner than the compression pad 44 and/or thinner than the battery cells 42. "Flexible" means that the insertion auxiliary layers 46 are elastically deformable in the thickness direction D.

The insertion auxiliary layers 46 may be relatively stiff in the insertion direction E in order to be able to transmit longitudinal forces.

The battery cell package 40 may also comprise end plates 48 arranged at opposite ends of the battery cell package 40 in the insertion direction E. The end plates 48 may be formed from plastic. The end plates 48 may accommodate high-voltage connectors 49 that are held without force in the end plates 48. The end plates 48 may be supported on the battery cells 42 and may be softer in the direction of the interior of the battery cell package 40 than in the direction of the exterior of the battery cell package 40. The insertion auxiliary layers 46 may be fastened to the end plates 48.

The battery module housing 30 may be formed from a unipartite profile, in particular from an aluminum extruded profile.

The battery cell package 40 may have two compression pads 44 arranged parallel to the battery cells 42 and each may be arranged between an outer battery cell 43 and one of the insertion auxiliary layers 46.

Each insertion auxiliary layers 46 may be formed from a metal sheet or from fiber-reinforced plastic. The fiber-reinforced plastic may comprise fibers extending parallel to the insertion direction E. These fibers may be continuous fibers. According to a particular embodiment, the insertion auxiliary layers 46 may be manufactured from a continuous glass fiber-reinforced GFRP strip.

The battery module may also have a friction-reducing coating arranged either on the outside of the insertion auxiliary layers 46 or on the inside of inner walls 34 of the battery module housing 30 that are situated opposite the insertion auxiliary layers. The friction-reducing coating may be a polytetrafluoroethylene coating.

The at least two battery cells 42, the at least one compression pad 44 and the insertion auxiliary layers 46 may be bonded adhesively to one another.

The battery module 20 of one embodiment may be produced by a method that includes the following method steps:
providing a battery module housing 30 with an insertion opening 32;
providing a battery cell package 40 that has at least two battery cells 42 arranged parallel to one another and at least one compression pad 44 arranged parallel to the battery cells 42, with the at least two battery cells 42 and the at least one compression pad 44 being stacked one on top of the other in any desired order in a thickness direction D and with the battery cell package 40 also having two insertion auxiliary layers 46 that respectively form outer sides 41 of the battery cell package 40 that are situated oppositely in the thickness direction ID;
compressing the battery cell package 40 in the thickness direction ID; and
inserting the compressed battery cell package 40 in an insertion direction E through the insertion opening 32 into the battery module housing 30.

The insertion direction E and the thickness direction D may be approximately orthogonal to one another.

The battery cell package 40 may be compressed by cylindrical rollers R, preferably by rubberized cylindrical rollers. The cylindrical rollers R may be driven or may be mounted in a freely rotating manner.

The battery cell package 40 may be compressed in the thickness direction D at the same time as the battery cell package 40 is inserted in the insertion direction E. The compression and insertion may be realized by these cylindrical rollers R.

The cylindrical rollers R may be arranged in roller pairs. In a first portion A, the rollers R may be arranged in the shape of a funnel and taper in the insertion direction E, that is to say that the roller pairs have a spacing to one another that decreases in the insertion direction E. Thus, the battery cell package 40 may be compressed in the thickness direction D by a movement of the battery cell package 40 in the insertion direction E through the first portion A.

Figure 3:
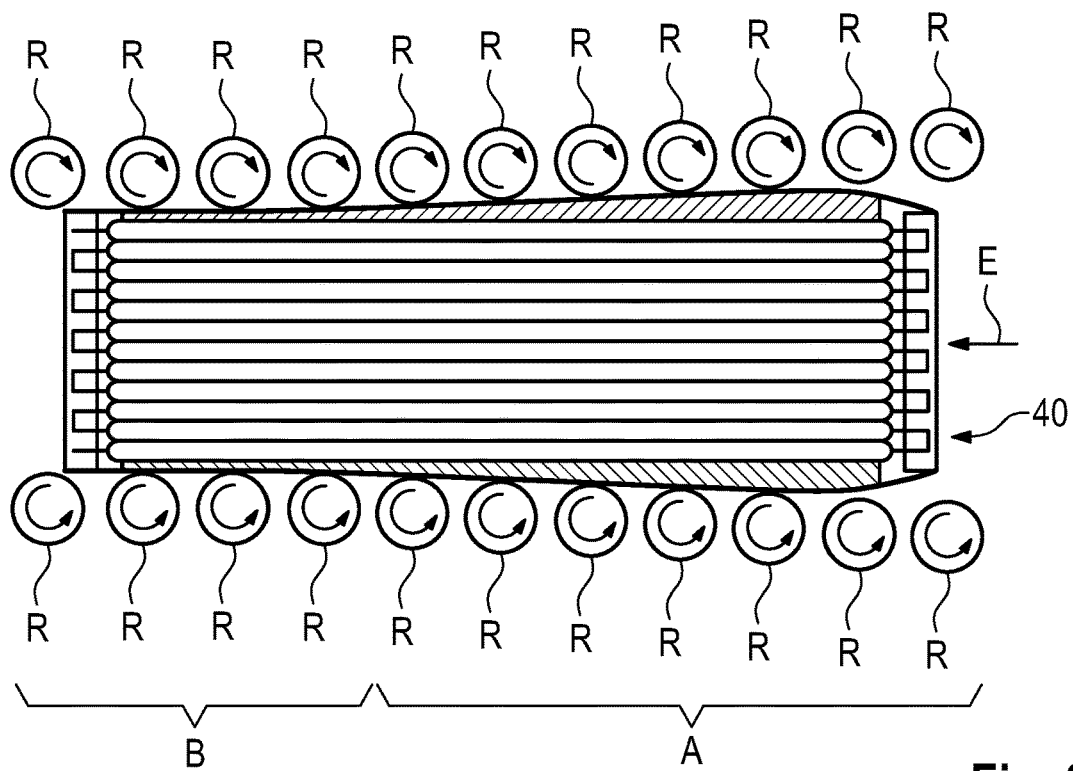
FIGS. 3 and 4 show a method for producing the battery module.
Figure 4:
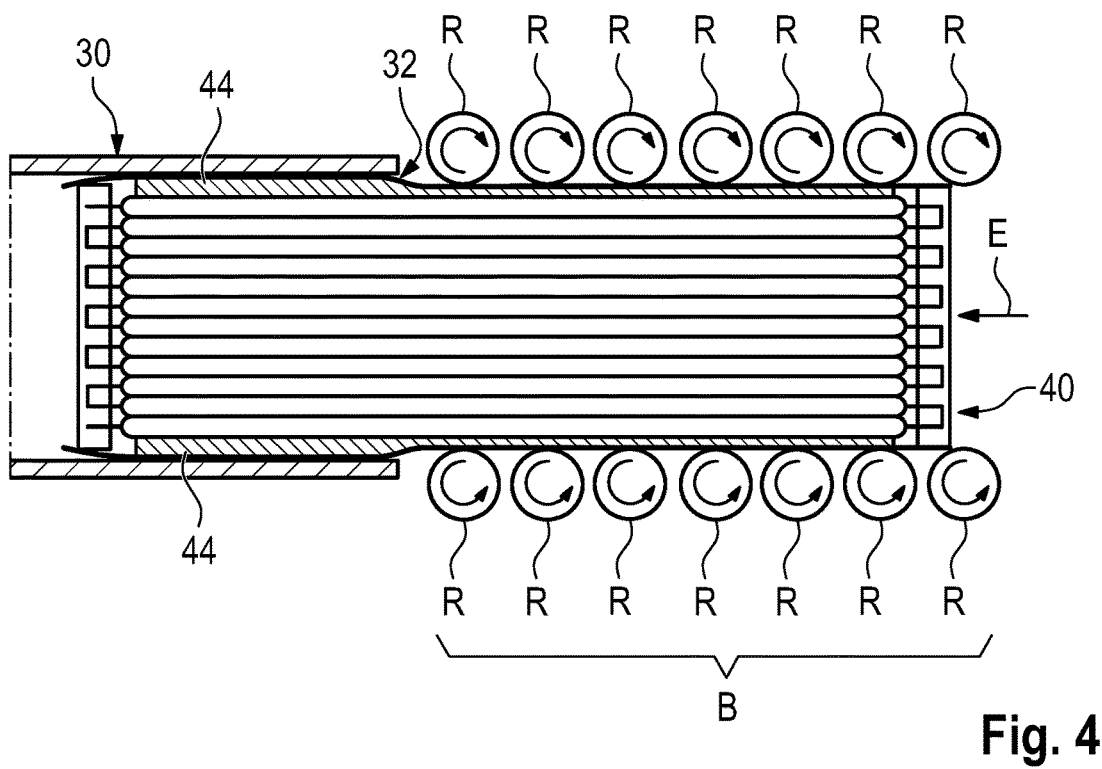

In a second portion B, which is arranged downstream of the first portion A in the insertion direction E, the roller pairs may have a consistent spacing and may function to feed the compressed battery cell package 40 into the insertion opening 32, as shown in FIGS. 3 and 4.

What is claimed is:

1. A battery module for a motor vehicle, comprising:
a battery module housing with an insertion opening extending into the battery module housing in a longitudinal direction; and
a battery cell package arranged in the battery module housing, the battery cell package having:
battery cells with opposite ends spaced apart in the longitudinal direction so that the battery cells are arranged parallel to one another,
at least one compression pad having opposite longitudinal ends spaced apart in the longitudinal direction, the at least one compression pad being arranged parallel to the battery cells, the battery cells and the at least one compression pad being stacked one on top of the other in a thickness direction that is transverse to the longitudinal direction, and
two insertion auxiliary layers that respectively form outer sides of the battery cell package that are situated oppositely in the thickness direction, the insertion auxiliary layers having opposite ends projecting in the longitudinal direction to positions that are beyond opposite ends of the battery cells and the at least one compression pad, wherein:
the battery cell package is inserted in the longitudinal direction through the insertion opening into the battery module housing, and the opposite ends of the insertion auxiliary layers are deformed inwardly and toward one another.

2. The battery module of claim 1, wherein the battery module housing is formed from an aluminum extruded profile.

3. The battery module of claim 1, wherein the at least one compression pad comprises two compression pads arranged parallel to the battery cells and arranged respectively between an outer battery cell and one of the insertion auxiliary layers.

4. The battery module of claim 3, wherein each of the insertion auxiliary layers is formed from a metal sheet.

5. The battery module of claim 3, wherein each of the insertion auxiliary layers is formed from fiber-reinforced plastic.

6. The battery module of claim 5, wherein the fiber-reinforced plastic is formed from fibers extending parallel to the insertion direction.

7. The battery module of claim 1, further comprising a friction-reducing coating arranged on at least one of an outside of the insertion auxiliary layers or on an inside of inner walls of the battery module housing that are situated opposite the insertion auxiliary layers.

8. The battery module of claim 7, wherein the friction-reducing coating is a polytetrafluoroethylene coating.

9. The battery module of claim 1, wherein the battery cells, the at least one compression pad and the insertion auxiliary layers are adhesively bonded to one another.

10. The battery module of claim 1, further comprising opposite end plates at positions opposed respectively to the opposite ends of the battery cells, the opposite end plates being fastened respectively to the opposite longitudinal ends of the insertion auxiliary layers.

11. The battery module of claim 1, wherein the insertion auxiliary layers are thinner than the at least one compression pad and thinner than the battery cells in the thickness direction, and the insertion auxiliary layers being deformable in the thickness direction.

12. The battery module of claim 1, wherein the battery cells and the at least one compression pad being stacked one on top of the other so that each of the battery cells is positioned adjacent at least one other one of the battery cells, the at least one compression pad comprising two compression pads disposed respectively between the two insertion auxiliary layers and one of the battery cells.

13. A method for producing a battery module, comprising:
providing a battery module housing with an insertion opening extending into the battery module housing in a longitudinal direction;
providing a battery cell package that has battery cells with opposite ends spaced apart in the longitudinal direction so that the battery cells are arranged parallel to one another and at least one compression pad arranged parallel to the battery cells, the battery cells and the at least one compression pad being stacked one on top of the other in a thickness direction and the battery cell package also having two insertion auxiliary layers that respectively form outer sides of the battery cell package and that are situated oppositely in the thickness direction, the insertion auxiliary layers having opposite ends projecting beyond the opposite ends of the battery cells in the longitudinal direction;
compressing the battery cell package in the thickness direction; and
inserting the compressed battery cell package in an insertion direction through the insertion opening into the battery module housing, wherein the opposite longitudinal ends of the insertion auxiliary layers that project beyond the opposite ends of the battery cells are deformed inward and toward one another relative to parts of the insertion auxiliary layers that align in the thickness direction with the battery cells and the at least one compression pad.

14. The method of claim 13, wherein the insertion direction and the thickness direction run approximately orthogonal to one another.

15. The method of claim 14, wherein the step of compressing the battery cell package comprises compressing the battery cell package between cylindrical rollers.

16. The method of claim 13, further comprising positioning opposite end plates at positions opposed respectively to the opposite ends of the battery cells, and fastening the opposite longitudinal ends of the insertion auxiliary layers to the respective end plates.

17. The method of claim 13, further comprising arranging a friction reducing coating on outwardly facing surfaces of the insertion auxiliary layers.

18. The method of claim 13, further comprising arranging a friction reducing coating on inwardly facing surfaces of the battery module housing.

19. The method of claim 13, further comprising adhesively bonding the insertion auxiliary layers to the at least one compression pad or to at least one of the battery cells.

* * * * *